Patented July 14, 1936

2,047,549

UNITED STATES PATENT OFFICE 2,047,549

PRODUCTION OF MAGNESIUM CHLORATE

George Lewis Cunningham, Niagara Falls, N. Y., assignor to The Mathieson Alkali Works, Inc., New York, N. Y., a corporation of Virginia No Drawing. Application February 8, 1934, Serial No. 710,326

5 Claims. (Cl. 23—85)

This invention relates to improvements in the production of magnesium chlorate. More particularly, the invention comprises improvements in the chlorination of magnesium hydrate to produce a mixture of magnesium chloride and magnesium chlorate and, in combination with such chlorination of magnesium hydrate, extraction of magnesium chlorate from this mixture with acetone.

When calcium hydroxide, as such, is chlorinated a complex mixture including chlorides and hypochlorites of calcium, bleaching powder, is formed. When magnesium hydroxide, as such, is chlorinated, however, a mixture consisting essentially of magnesium chloride and magnesium chlorate is formed. The reaction proceeds about as follows:

$6Mg(OH)_2 + 6Cl_2 \rightarrow 5MgCl_2 + Mg(ClO_3)_2 + 6H_2O$

It is thus possible to produce directly a magnesium chloride-magnesium chlorate mixture of low water content.

The reaction proceeds efficiently provided the magnesium hydrate supplied to the chlorination is associated, as subjected to the chlorination, with water in proportion such that the molecular ratio $MgO:H_2O$ lies between about 1:1 and 1:1.5. In this range of hydration the magnesium hydroxide appears to be peculiarly active, particularly when the molecular ratio $MgO:H_2O$ approximates 1:1.5.

A magnesium hydrate appropriate for carrying out the invention can be produced, for example, by calcining magnesite at a temperature not exceeding 1000° C. or better not exceeding 700° C., hydrating the calcined product with an excess of water at about 100° C. and evaporating the excess water at a temperature not exceeding about 100° C. A magnesium hydrate appropriate for carrying out the invention can also be produced by hydrating magnesium oxide, produced by calcining magnesite at temperatures above 1000° C. or by thermally dissociating magnesium chloride, with steam at a temperature not exceeding about 150° C., advantageously under a superatmospheric pressure of about one atmosphere.

Chlorination can be carried out in conventional apparatus such as is used for the production of bleaching powder from calcium hydroxide. Mechanical agitation of the magnesium hydrate promotes the chlorination to the extent that it promotes exposure of a maximum surface of the magnesium hydrate to the chlorine or the chlorine-containing gas supplied to the chlorination. The reaction proceeds at ordinary atmospheric temperatures but it is advantageously carried out at a temperature approximating 40°–50° C. Higher or lower temperatures, however, may be used. It is also advantageous, although not necessary, to maintain the relative humidity of the chlorine or chlorine-containing gas supplied to the chlorination at about 50%–75% of saturation.

Instead of carrying out the chlorination in such conventional apparatus, it may with advantage be carried out in the presence of an inert chlorine solvent immiscible with water, such as carbon tetrachloride. Complete and rapid chlorination of the magnesium hydrate is thus effected. In so carrying out the invention, the magnesium hydrate may be supplied to the chlorination suspended in the inert chlorine solvent and chlorination may be effected by countercurrent contacting of this suspension with the chlorine or chlorine-containing gas. Following chlorination in this manner, the magnesium chloride-magnesium chlorate mixture may be recovered by filtration or by evaporation or by a combination of these operations or by extraction with water.

Application Serial Number 710,530, filed February 9, 1934, by me, describes the separation of magnesium chlorate from mixtures including magnesium chloride by extraction with acetone. As there described, the extraction is with advantage carried out upon a chloride-chlorate mixture the water content of which is such that the molecular ratio $H_2O:MgCl_2+Mg(ClO_3)_2$ does not exceed about 6:1.

The direct production of a magnesium chloride-magnesium chlorate mixture in accordance with the present invention is combined with such extraction of magnesium chlorate from the mixture with acetone with special advantage in the production of magnesium chlorate. The extraction can be applied directly to the product of the chlorination without requiring concentration, by evaporation or otherwise, for the purpose of effecting efficient extraction.

I claim:

1. In the production of magnesium chlorate, the improvement which comprises chlorinating a magnesium hydrate associated with water in proportion such that the molecular ratio $MgO:H_2O$ approximates 1:1–1.5 in the presence of an inert chlorine solvent immiscible with water.

2. In the production of magnesium chlorate, the improvement which comprises chlorinating a magnesium hydrate associated with water in proportion such that the molecular ratio MgO:H₂O approximates 1:1–1.5 in the presence of carbon tetrachloride.

3. In the production of magnesium chlorate, the improvement which comprises chlorinating a magnesium hydrate associated with water in proportion such that the molecular ratio MgO:H₂O approximates 1:1–1.5 and extracting magnesium chlorate from the magnesium chloride-magnesium chlorate mixture so produced with acetone.

4. In the production of magnesium chlorate, the improvement which comprises chlorinating a magnesium hydrate in the presence of an inert chlorine solvent immiscible with water.

5. In the production of magnesium chlorate, the improvement which comprises chlorinating a magnesium hydrate and extracting magnesium chlorate from the magnesium chloride-magnesium chlorate mixture so produced with acetone.

GEORGE LEWIS CUNNINGHAM.